(12) United States Patent
Hoppel

(10) Patent No.: US 10,219,433 B2
(45) Date of Patent: Mar. 5, 2019

(54) SYSTEM FOR FORWARD MOUNTING ATTACHMENTS TO A WHEELED VEHICLE

(71) Applicant: Green Industry Innovators, L.L.C., Louisville, OH (US)

(72) Inventor: Steffon L. Hoppel, Louisville, OH (US)

(73) Assignee: Green Industry Innovators, L.L.C., Louisville, OH (US)

( * ) Notice: Subject to any disclaimer, the term of this patent is extended or adjusted under 35 U.S.C. 154(b) by 0 days.

(21) Appl. No.: 15/912,725

(22) Filed: Mar. 6, 2018

(65) Prior Publication Data

US 2018/0192589 A1   Jul. 12, 2018

Related U.S. Application Data

(62) Division of application No. 14/955,095, filed on Dec. 1, 2015, now Pat. No. 9,943,032.

(51) Int. Cl.
*A01D 43/00* (2006.01)
*A01D 42/00* (2006.01)
(Continued)

(52) U.S. Cl.
CPC ............ *A01D 43/00* (2013.01); *A01B 59/048* (2013.01); *A01B 59/064* (2013.01);
(Continued)

(58) Field of Classification Search
CPC ...... A01D 43/00; A01D 43/06; A01D 43/077; A01D 43/12; A01D 43/14; A01D 42/00;
(Continued)

(56) References Cited

U.S. PATENT DOCUMENTS 2,670,175 A   2/1954   Schaich
2,714,347 A   8/1955   Roessler
(Continued)

FOREIGN PATENT DOCUMENTS

DE   939960   3/1956
FR   2577746   8/1986

*Primary Examiner* — Alicia Torres
(74) *Attorney, Agent, or Firm* — Sand, Sebolt & Wernow LPA

(57) ABSTRACT

An apparatus, system, and method of securing attachments to a utility vehicle, particularly a stand-on, zero-turn mower. The apparatus includes an A-shaped mounting assembly having a base with first and second ends and a tubular member extending outwardly from the first end. The tubular member defines a bore that receives a shaft extending from the attachment. The mounting assembly is positioned vertically above a mower deck on an opposite side of the frame of the mower relative thereto. The second end of the mounting assembly and part of the mower deck are secured to the frame using the same connectors. A hydraulic actuator engages a forwardmost end of the assembly and is actuatable to raise or lower the assembly relative to the frame, pivoting the assembly about the connectors. The attachment and mower deck are substantially simultaneously operable to perform separate landscaping tasks while the mower moves across a surface.

18 Claims, 7 Drawing Sheets

(51) Int. Cl.
*A01D 42/08* (2006.01)
*A01D 42/04* (2006.01)
*A01D 34/66* (2006.01)
*A01B 59/06* (2006.01)
*A01B 59/048* (2006.01)
*A01D 43/12* (2006.01)
*A01D 101/00* (2006.01)

(52) U.S. Cl.
CPC .......... *A01D 34/662* (2013.01); *A01D 42/00* (2013.01); *A01D 42/04* (2013.01); *A01D 42/08* (2013.01); *A01D 43/12* (2013.01); *A01D 2101/00* (2013.01)

(58) Field of Classification Search
CPC ........ A01D 42/06; A01B 59/00; A01B 59/04; A01B 59/048
See application file for complete search history.

(56) References Cited

U.S. PATENT DOCUMENTS

| | | |
|---|---|---|
| 2,729,199 A | 1/1956 | Jones |
| 3,007,266 A | 11/1961 | Brand |
| 3,525,201 A | 8/1970 | Kaufman |
| 3,618,671 A | 11/1971 | Chantland |
| 3,901,003 A | 8/1975 | Erdman |
| 3,913,684 A | 10/1975 | Casey et al. |
| 4,737,067 A | 4/1988 | Samejima et al. |
| 5,040,615 A | 8/1991 | Fletcher |
| 5,082,065 A | 1/1992 | Fletcher |
| 5,123,805 A | 6/1992 | Ishimori et al. |
| 5,901,538 A | 5/1999 | Vohl |
| 6,832,657 B1 | 12/2004 | LaFlair |
| 7,069,711 B1 | 7/2006 | Connell et al. |
| 7,596,936 B2 | 10/2009 | Schick |
| 7,730,705 B2 | 6/2010 | Kubinski |
| 8,220,240 B2 * | 7/2012 | Tielburger ............. A01D 43/02 56/193 |
| 2006/0096133 A1 | 5/2006 | Sanders et al. |
| 2006/0192359 A1 * | 8/2006 | Brooks .................. A01D 43/00 280/100 |
| 2009/0045668 A1 | 2/2009 | Brooks |
| 2010/0164202 A1 | 7/2010 | Dilworth et al. |
| 2011/0203816 A1 | 8/2011 | Hurley |
| 2014/0331628 A1 | 11/2014 | Fichera |

* cited by examiner

SYSTEM FOR FORWARD MOUNTING ATTACHMENTS TO A WHEELED VEHICLE

CROSS-REFERENCE TO RELATED APPLICATIONS

This is a divisional of U.S. patent application Ser. No. 14/955,095, filed Dec. 1, 2015, the entire disclosure of which is incorporated herein by reference.

BACKGROUND OF THE INVENTION

Technical Field

This invention relates generally to powered, wheeled vehicles. More particularly, this invention relates to a method and apparatus for securing a variety of different attachments to a vehicle in a position forward of an operator. Specifically, this invention is directed to a mounting assembly for forward mounting attachments to a mower, particularly a zero-turn mower, where the mounting assembly includes a hydraulically operable A-frame engageable with the mower's frame utilizing some of the same components that mount a deck hanger assembly for a mower deck to the frame.

Background Information

Landscapers and other contractors utilize wheeled vehicles to aid them in performing various landscaping tasks. It is known to secure attachments to such vehicles. For instance, it is known to engage towable carts to a rear end of a landscaping vehicle's frame and in other instances to secure attachments such as grader blades or rotatable brushes to a front end of the vehicle.

It would be desirable for an operator to be able to secure a wider variety of different attachments to these vehicles. Attachments such as hoppers, mulching attachments, edgers, aerators, leaf blowers, leaf vacuums/collectors, snowplow blades, or snow blowers would all be useful to an operator. The problem is that while operators may desire to secure any and all of these devices to the front ends of their vehicles, all of these attachments are configured differently and typically require completely different connectors to attach them to the vehicle's frame. Because of this, operators have to be highly selective as to which attachments would be most useful to them and then install only the specific connector components necessary for securing those particular attachments to the frame.

SUMMARY

It would be desirable to have a more universal connector for securing a wider range of attachments to a front end of a vehicle's frame in a position forward of the operator. There is therefore a need in the art for an improved mounting assembly that may be utilized for this purpose. There is a further need for providing an improved mounting assembly that does not require extensive retrofitting of existing vehicles and which simplifies the fabrication and assembly of new vehicles.

An apparatus, system, and method of securing an attachment to a utility vehicle, particularly a stand-on, zero-turn mower is disclosed herein. The apparatus includes an A-shaped mounting assembly having a base with first and second ends and a tubular member extending outwardly from the first end. The tubular member defines a bore that receives a shaft extending from the attachment. The mounting assembly is positioned vertically above a mower deck but on an opposite side of the mower's frame relative thereto. The second end of the mounting assembly and part of the mower deck are secured to the frame using the same connectors. A hydraulic actuator engages a forwardmost end of the assembly and is actuatable to raise or lower the assembly relative to the frame, pivoting the assembly about the connectors. The attachment and mower deck are substantially simultaneously operable to perform separate landscaping tasks while the mower moves across a surface.

In one aspect, the invention may provide a system comprising a mower having a frame with a plurality of wheels mounted thereon and the mower has a turn radius that approximates zero; a mower deck; a deck hanging assembly detachably engageable with the mower deck; at least one connector for securing the deck hanging assembly to the frame; wherein the deck hanging assembly positions the mower deck beneath the frame; and a mounting assembly adapted to connect an attachment to the mower; wherein the at least one connector also secures part of the mounting assembly to the frame. The base and tubular member together may form an A-shaped frame where the tubular member comprises an apex of the A-shaped frame.

In another aspect, the invention may provide an assembly for mounting an attachment to a utility vehicle, said assembly comprising a base having a first end and a second end; a connector adapted to secure the second end to a frame of the vehicle in such a way that the base is pivotable relative to the frame; and a tubular member extending outwardly from the first end of the base; said tubular member defining a bore therein that is adapted to receive a shaft from the attachment therein.

In another aspect, the invention may provide a method of performing landscaping tasks comprising providing a zero-turn radius mower having a frame; providing a mower deck suspended from the frame; providing a mounting assembly detachably engaged with the frame and positioned generally vertically above the mower deck; positioning an attachment in front of a front end of the frame; maintaining the connection between the mower deck and the frame; securing the attachment to the mower utilizing the mounting assembly; moving the mower in a forward direction and the attachment leads the mower across a lawn; activating the attachment to perform a first landscaping task as the mower moves across the lawn; and activating the mower deck to perform a second landscaping task as the mower moves across the lawn. In another aspect the first and second landscaping tasks are performed substantially simultaneously.

In yet a further aspect, the invention may provide a method of installing a mounting assembly for detachable engagement of an attachment to a mower comprising providing a frame on the mower; providing a mower deck; providing the mounting assembly; securing a first region of the mower deck to the frame using one or more first connectors; securing a second region of the mower deck to the frame using one or more second connectors; securing the mounting assembly to the frame using the same one or more second connectors that secure the second region of the mower deck to the frame.

In an additional aspect, the invention may provide a method of installing a mounting assembly for engagement of an attachment to a mower comprising providing a frame on the mower; providing the mounting assembly; providing connectors on the frame; said connectors being positioned and adapted to selectively engage a mower deck to the frame; and securing the mounting assembly to the frame using at least some of the connectors that are adapted to secure the mower deck to the frame.

BRIEF DESCRIPTION OF THE SEVERAL VIEWS OF THE DRAWINGS

A sample embodiment of the invention is set forth in the following description, is shown in the drawings and is particularly and distinctly pointed out and set forth in the appended claims.

Similar numbers refer to similar parts throughout the drawings.

DETAILED DESCRIPTION

Referring to FIGS. 1-9, there is shown a powered mower in accordance with an aspect of the present invention, generally indicated at 10. The mower illustrated herein is a stand-on mower, i.e., the operator stands on a platform instead of sitting on a seat. The mower is a zero-turn mower meaning that the wheels are mounted on the mower and are operable in such a manner that the mower has a turning radius that is close to zero.

It will be understood that the components and principles disclosed herein could be utilized on vehicles other than mowers and on vehicles, including mowers, that are not zero-turn radius vehicles but have wider turning radii. and/or which are sit-on type vehicles instead of stand-on vehicles. Additionally, while the disclosure is directed to forward mounting of attachments to a vehicle, i.e., mounting attachments so that they are located in front of the vehicle and in front of the operator, the same components and principles could be utilized for side-mounting of attachments or for rear-mounting of attachments to vehicles. The terms "vehicle", "utility vehicle" and "mower" used herein should therefore be understood to encompass any wheeled vehicle to which attachments may be engaged for performing a task. In the following description the term "mower" will be utilized to represent all such vehicles.

Figure 1:
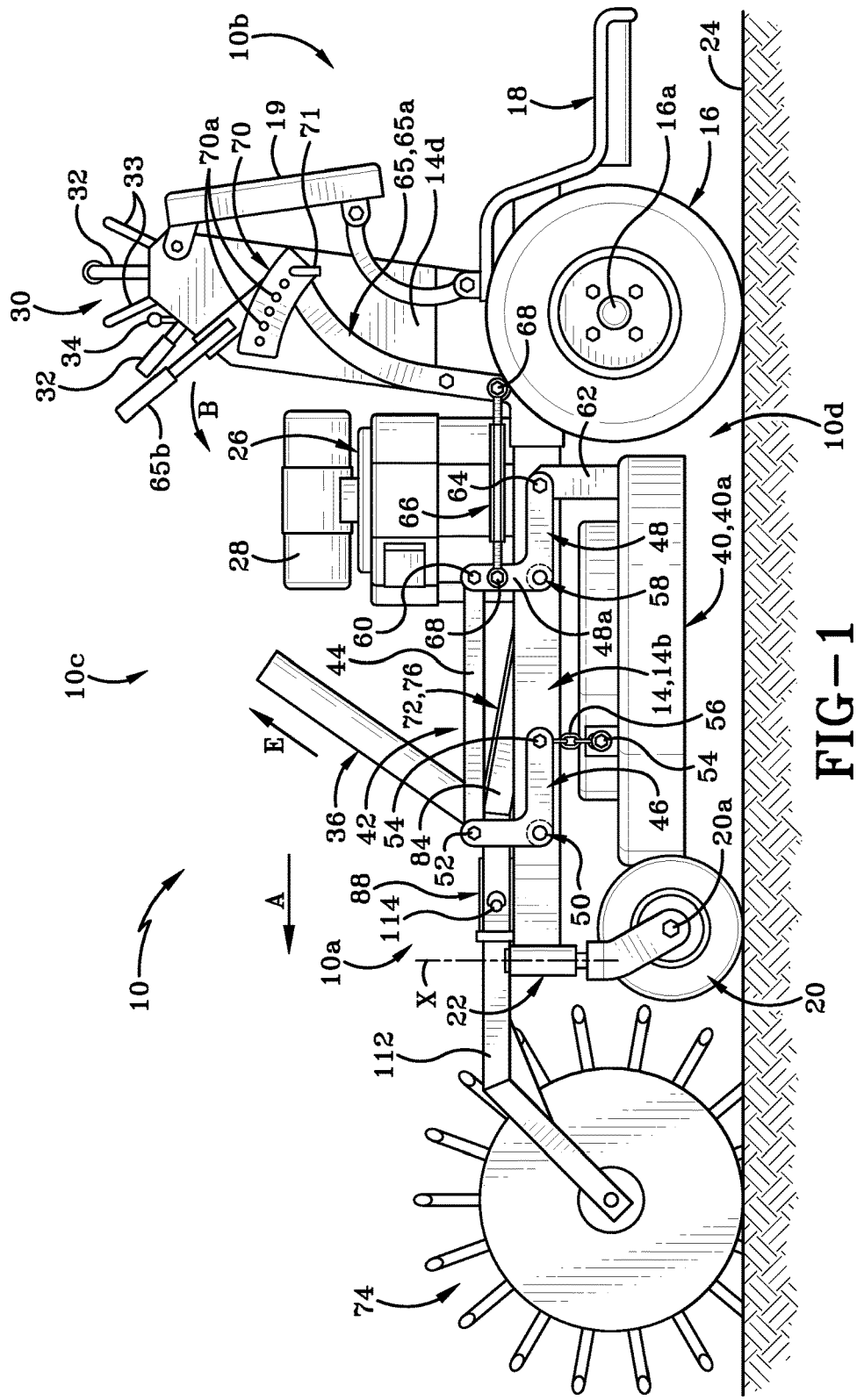
FIG. 1 is a left side view of a generic wheeled vehicle, specifically a mower, with an attachment forward mounted on the frame by way of a mounting assembly in accordance with an aspect of the present invention.
Figure 2:
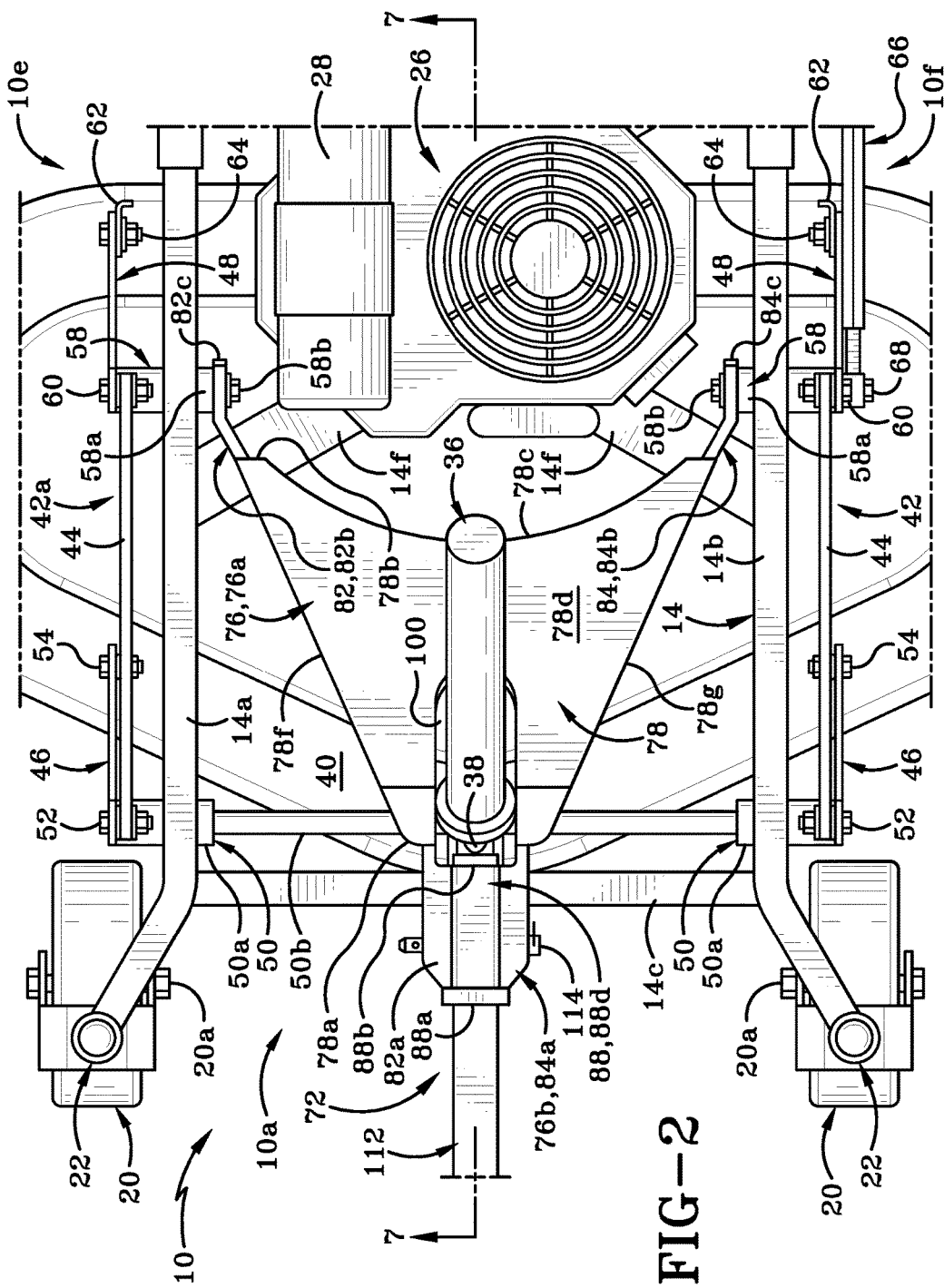
FIG. 2 is a partial top view of the mower showing the mounting assembly positioned proximate a front end of the frame and showing part of a mower deck beneath the mounting assembly.

Referring to FIGS. 1 and 2, mower 10 has a front end 10*a*, a rear end 10*b*, a top 10*c*, a bottom 10*d*, a right side 10*e*, and a left side 10*f*. The front end 10*a* of the mower is that part of the mower which is in front of the operator when mower 10 is moving in the direction indicated by arrow "A" (shown in FIG. 1). Front end 10*a* and rear end 10*b* define a longitudinal direction between them and a longitudinal axis of mower 10 extends between front and rear ends 10*a*, 10*b*. Top 10*c* and bottom 10*d* define a vertical direction between them. Right side 10*e* and left side 10*f* define a lateral direction between them.

Referring to FIG. 2, mower 10 has a rigid frame 14 that includes a right side member 14*a*, a left side member 14*b*, and a front member 14*c*. Frame 14 also includes a rear frame member that extends between right and left side members 14*a*, 14*b* but is not illustrated in the figures. Right and left side members 14*a*, 14*b* extend longitudinally from proximate front end 10*a* to proximate rear end 10*b*. Front member 14*c* and rear frame member extend laterally between right and left side members 14*a*, 14*b*. Frame 14 further includes upstanding member(s) 14*d* that extend vertically upwardly and outwardly from right and left side members 14*a*, 14*b* and from the rear frame member. Frame 14 may also include other cross-braces and members such as engine mounting members 14*f* (FIG. 2).

Mower 10 has wheels mounted on frame 14 in such a way that the mower's turning radius approximates zero. Mower 10 has powered (or driven) right and left rear wheels 16 operatively mounted on frame 14 via axle(s) 16*a*. A platform 18 is secured to frame 14 rearwardly of rear wheels 16. Platform 18 is provided for an operator to stand upon and may include a suspension system to make the stand-on ride for the operator more comfortable. It will be understood that a seat may alternatively or additionally be provided on mower 10 instead of platform 18 and this seat would also be operatively engaged with frame 14.

Non-powered right and left front wheels 20 are mounted on right and left members 14*a*, 14*b*, respectively. Each front wheel 20 may be a caster-type wheel that is operatively engaged with frame 14 via a wheel mounting assembly 22 which enables the wheel to pivot through 360 degrees about an axis "X" (FIG. 1). Each front wheels 20 rotates about an axle 20*a*. Mounting attachments 22 may include a locking mechanism to fix front wheels 20 in a particular orientation and prevent the wheels from rotating about axis "X". Wheels 16, 20 are positioned to engage a surface 24 and move mower 10 in a forward direction (arrow "A" in FIG. 1) or a rearward direction (opposite to arrow "A") or to the left or right.

Various other components of mower 10 are operatively engaged with or mounted on frame 14. The figures show a pad 19 mounted to frame member 14*d* that may be used by the operator to lean on when standing on platform 18. Other components illustrated in the figures include an engine 26, an oil filter 28, and a control panel 30. Various other components used in mowers 10 are well known in the art and are not illustrated in the attached figures for clarity. Control panel 30 is shown mounted on upstanding member 14*d* of frame 14. By way of illustration only control panel 30 includes hand-operable levers 32 and a joystick 34 for controlling various components on mower 10. Handles 33 are also shown extending upwardly from control panel 30. Handles 33 provide a place for an operator to hold on to during operation of mower 10. Mower 10 also includes a hydraulic system for operating various components but only a cylinder 36 and piston 38 are shown in the figures. It will be understood that hydraulic lines and electrical wiring will be utilized on mower 10 but these components have been omitted from the figures for clarity of illustration.

Referring still to FIG. 2, a mower deck 40 is suspended beneath frame 14 by a deck hanger assembly 42. A first part 42*a* of deck hanger assembly 42 is positioned adjacent right side member 14*a* and a second part 42*b* of deck hanger assembly 42 is positioned adjacent left side member 14b. Each of first and second parts 42a, 42b includes a base plate 44, a front pivot bar 46 and a rear pivot bar 48. The front and rear pivot bars 46, 48 are spaced a distance from each other along base plate 44.

Figure 7:
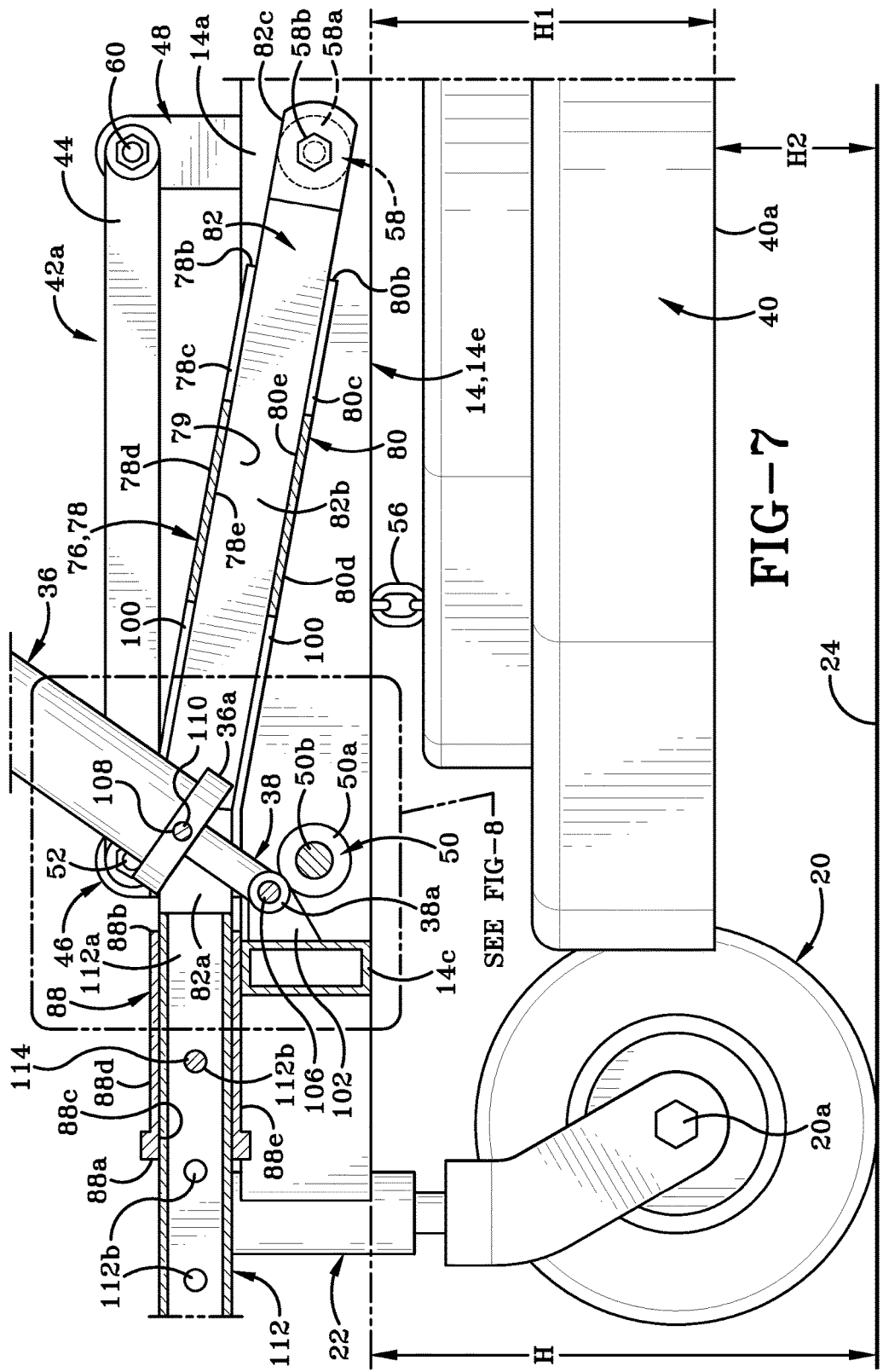
FIG. 7 is a longitudinal cross-section taken along line 7-7 of FIG. 2.

Referring to FIGS. 1, 2 and 7, front pivot bar 46 is secured to base plate 44, to the adjacent right or left side member 14a, 14b, and to mower deck 40. A fastener assembly 50 secures each front pivot bar 46 to frame 14 and enables front pivot bar 46 to pivot relative thereto. Fastener assembly 50 includes a sleeve 50a extending through an aperture in the adjacent one of right and left side members 14a, 14b. A pivot rod 50b extends between the two sleeves 50a (FIG. 2) and is located rearwardly of front member 14c. A fastener 52 secures front pivot bar 46 to base plate 44 and fasteners 54 together with a chain 56 secures front pivot bar 46 to mower deck 40.

Rear pivot bar 48 is secured to base plate 44, to the adjacent right or left side member 14a, 14b and to mower deck 40. Rear pivot bar 48 is also secured to an adjustment assembly 64 that is operable to manually raise or lower mower deck 40 relative to frame 14. Rear pivot bar 48 is located a distance rearwardly of front pivot bar 46 along frame 14. A fastener assembly 58 secures each rear pivot bar 48 to one of right or left side members 14a, 14b in such a way that rear pivot bar 48 is able to pivot relative to the side member 14a, 14b.

Each fastener assembly 58 may include a sleeve 58a extending through an aperture in the associated right or left side members 14a, 14b. A bolt 58b is insertable through a bore of sleeve 58a to secure rear pivot bar 48 to frame 14. Fastener 60 secures rear pivot bar 48 to base plate 44. Fastener 64 secures rear pivot bar 48 to a flange 62 that extends upwardly from mower deck 40.

Since pivot rod 50b connects the two front pivot bars 46 together, motion in both of the first and second parts 42a, 42b of deck hanger assembly 42 is coordinated and in unison. Additionally, because the first and second parts 42a, 42b of deck hanger assembly 42 are connected, initiating movement in any of the components of assembly 42 will result in a related movement in the rest of the assembly. Mower 10 also includes an adjustment assembly that utilizes the unitary movement of deck hanging assembly to adjust the position of mower deck 40 relative to frame 14. The adjustment assembly includes an adjustable lever arm 65 that is operatively engaged with assembly 42. Lever arm 65 may be mounted to frame member 14d or an extension thereof and extend outwardly from and form part of control panel 30. Lever arm 65 may be a generally L-shaped member having a first and second section 65a, 65b oriented at an angle relative to each other. First section 65a is operatively engaged with rear pivot arm 48 of assembly 42 via a linkage 66. Fasteners 68 secure linkage 66 to lever arm 65 and rear pivot arm 48. An adjustment plate 70 is provided on frame member 14d proximate the portion of lever arm 65 where first and second sections 65a, 65b intersect. Adjustment plate 70 defines a plurality of apertures 70a therein spaced at intervals relative to each other. Apertures 70a are selectively aligned with a hole defined in the second section 65b of lever arm 65. A pin 71 is insertable through a selected one of apertures 70a and the hole in second section 65b to lock lever arm 65 at any particular orientation. When pin 71 is withdrawn from aperture 70a and the aligned hole lever arm 65 is free to rotate about fastener 68 in a direction indicated by arrow "B" (FIG. 1) or in a direction opposite to arrow "B". Pin 71 may be stored in a clip 73 when not in use.

Figure 3:
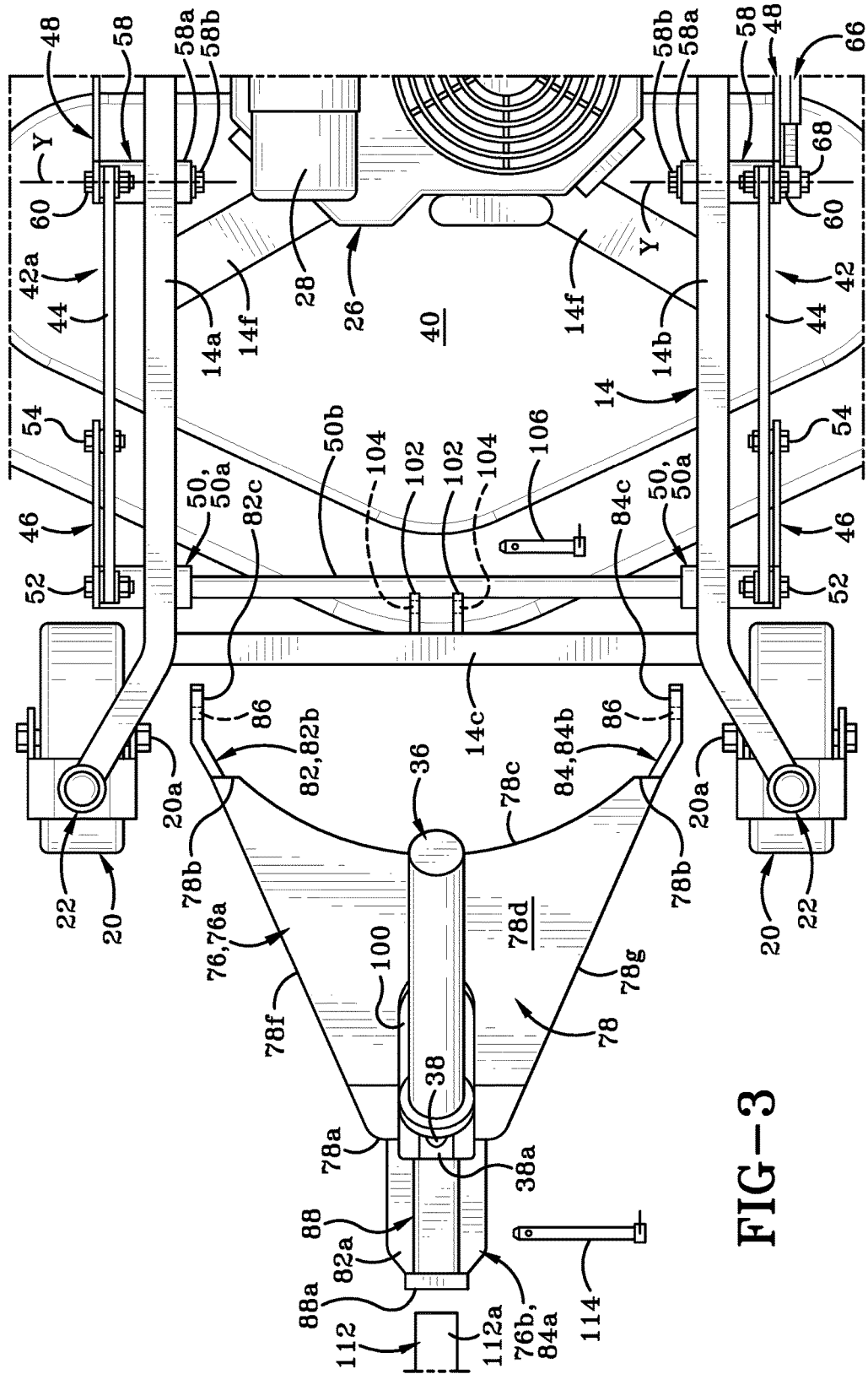
FIG. 3 is an exploded partial top view of the mower, the mounting assembly, and the mower deck.
Figure 9:
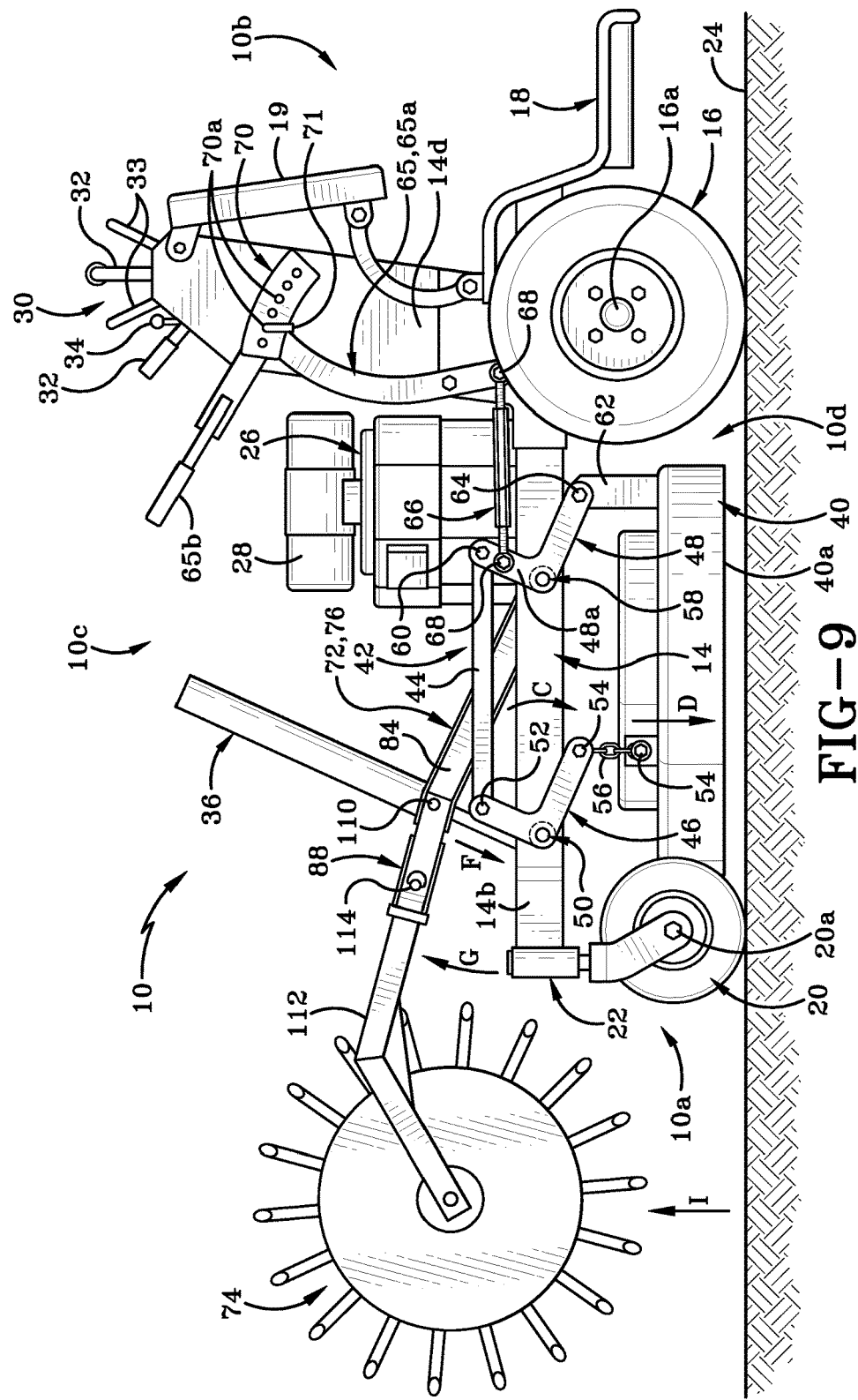
FIG. 9 is a left side view of the mower with the mounting assembly moved to a raised position, thereby raising the attachment connected thereto.

In order to lower mower deck 40 downwardly away from a lowermost surface 14e (FIG. 7) of frame 14, pin 71 is withdrawn from plate 70. The operator grasps second section 65b of lever arm 65 and moves the same so that first section 65a will rotate in the direction indicated by arrow "B" to a new position relative to adjustment plate 70. As the lever arm 65 moves the movement is transferred to linkage 66 and thereby to rear pivot arm 48. The movement created in linkage 66 causes rear pivot arm 48 to be rotated about axis "Y" (FIG. 3). This motion is transmitted to base plate 44, and front pivot arm 46 which pivots about fastener assembly 50 in the direction indicated by arrow "C" (FIG. 9). That motion is transferred to the rest of deck hanger assembly 42. As a result, the mower deck 40 is moved downwardly in the direction of arrow "D" (FIG. 9) thus increasing the distance "H1" (FIG. 7) between mower deck 40 and surface 14e of frame 14. As mower deck 40 moves downwardly the distance "H2" between the underside 40a of mower deck 40 and the ground surface 24 is decreased bringing deck 40 into a position where it can cut grass. Raising the mower deck 40 again simply requires reversal of the aforementioned steps. It should be noted that the overall distance "H" (FIG. 7) between surface 14e and ground surface 24 remains essentially unchanged while mower deck's height relative to the surface 14e of frame 14 is selectively changeable.

In accordance with an aspect of the present invention, mower 10 includes a hydraulically-actuated mounting assembly 72 (FIGS. 1 and 2) for securing any one of a plurality of different attachments to mower 10. Mounting assembly 72 is positioned so that a selected attachment 74 is secured to mower 10 in a location in front of where the mower's operator will be standing or seated. FIGS. 1 and 9 illustrate an aerator as the attachment 74 that is secured by mounting assembly 72 to mower 10. Mounting assembly 72 comprises a generally A-shaped frame, referred to herein as A-frame 76. A-frame 76 is operatively engaged with right and left side members 14a, 14b of frame 14. A-frame 76 is also engaged with cylinder 36 and piston 38 and is operated therewith.

Referring to FIGS. 3-9, A-frame 76 generally includes a first region 76a and a second region 76b. When viewed from above, as in FIG. 4, first region 76a may have a generally truncated-triangular shape and second region 76b may have a generally rectangular shape. Second region 76b essentially comprises the apex of the A-shape of this A-shaped member 76 and a portion of first region 76a essentially comprises the base and the third sections 82c, 84c comprise the pair of spaced-apart "legs" of the A-shape. The legs extend outwardly from the opposite end of the A-shape from the apex of the A-shape.

First region 76 includes a first plate 78 and a second plate 80 that are positioned substantially parallel to each other and aligned with each other. A space 79 (FIG. 7) is defined between first and second plates 78, 80. First plate 78 has a first end 78a and a second end 78b. When A-frame 76 is installed on mower 10, first end 78a of plate 78 is the forwardmost end of first plate 78 and second end 78b is the rearwardmost end thereof. Second end 78b may include a concavely curved section 78c that may be provided to give improved clearance between A-frame 76 and components such as engine 26. First plate 78 also has an outer surface 78d, an inner surface 78e, a first side 78f, and a second side 78g.

Similarly, second plate 80 has a first end 80a and a second end 80b. When A-frame 76 is installed on mower 10, first end 80a is the forwardmost end of second plate 80 and second end 80b is the rearwardmost end of second plate 80. Second end 80b may also include a concavely curved section 80c provided to give improved clearance between A-frame 76 and components such as engine 26. Second plate 80 has an outer surface 80d, an inner surface 80e, a first side 80f, and a second side 80g. The various sides and ends of first and second plates 78, 80 are aligned with each other and space 79 is defined between the inner surfaces 78e and 80e.

Figure 5:
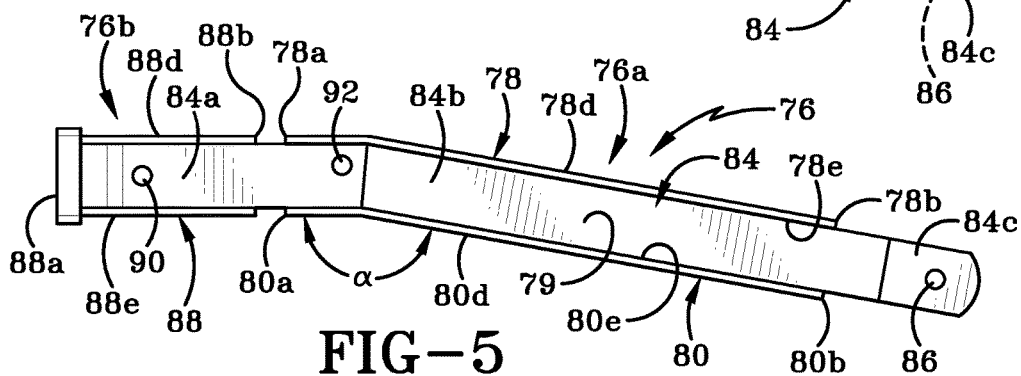
FIG. 5 is a left side view thereof.

Each plate 78, 80 may be of the truncated-triangular shape that dictates the overall shape of first region 76 when viewed from above. As best seen in FIG. 5, a region of each plate 78, 80 proximate first ends 78a, 80a may be angled relative to the rest of the respective plate. In particular, the region proximate first end 78a, 80a is oriented at an angle α relative to the rest of that plate. This angle aids in helping keep a strong and stable contact between an attachment that will be engaged with A-frame 76 and the A-frame itself. This will be discussed later herein.

A-frame 76 also includes a first side wall 82 and a second side wall 84. Side walls 82, 84 are substantially identical to each other and are engaged with first and second plates 78, 80 in an orientation that makes them mirror images of each other. First side wall 82 includes a first section 82a, a second section 82b, and a third section 82c. First and second sections 82a, 82b are oriented at an angle β (FIG. 4) and second and third sections 82b, 82c are oriented at an angle θ relative to each other. First and third sections 82a and 82c may be parallel to each other in which case angle β and angle θ may be of the same magnitude. Similarly, second side wall 84 includes a first section 84a, a second section 84b, and a third section 84c. First and second sections 84a, 84b are oriented at an angle β (FIG. 4) and second and third sections 84b, 84c are oriented at an angle θ relative to each other. First and third sections 84a and 84c may be parallel to each other in which case angle β and angle θ may be of the same magnitude.

First and second side walls 82, 84 are positioned between first and second plates 78, 80. In particular, second sections 82b, 84b are captured between the inner surfaces 78e, 80e and are welded or otherwise secured thereto. First sections 82a, 84a extend outwardly beyond first ends 78a, 80a in a first direction. As may be seen in FIG. 4, the first sections 82a, 84a are of a greater width that the rest of the first and second side walls 82, 84. These wider first sections 82a, 84a reinforce the forwardmost end of that part of A-frame 76 which will engage attachment 74. First sections 82a, 82b are laterally spaced apart from each other and oriented substantially parallel to each other and generally at right angles to first ends 78a, 80a. Third sections 82c, 84c extend outwardly beyond second ends 78b, 80b of first and second plates 78, 80 in a second direction. Third sections 82c, 84c are laterally spaced from each other and oriented substantially parallel to each other and generally at right angles to second ends 78b, 80b. Second sections 82b, 84b are oriented with the sections tapering inwardly toward each other from second ends 78b, 80b toward first ends 78a, and 80a. When A-frame 76 is installed on mower 10, first sections 82a, 84b, and third sections 82c, 84c may be oriented generally parallel to the longitudinal axis of mower 10. Third sections 82c, 84c essentially form the "legs" of the A-shape of A-frame 76.

Figure 6:
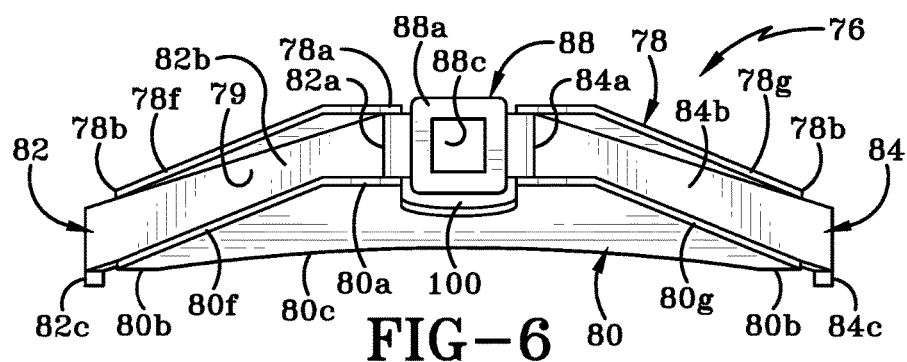
FIG. 6 is a front view thereof.

Second region 76b of A-frame 76 comprises a tubular member 88. Tubular member 88 comprises a standard two-inch hitch receiver that is generally square in cross-section (FIG. 6). Tubular member 88 has a first end 88a and a second end 88b that is remote from the first ends 78a, 80a of plates 78, 80. First end 88a is received in the space 79 between first and second plates 78, 80 and the remaining length of tubular member 88 extends outwardly from first ends 78a, 80a of plates 78, 80. Second end 88b of tubular member defines a bore 88c that extends from an opening in first end 88a to an opening in second end 88b. First end 88a preferably is fabricated as a thick collar that bounds and defines the opening into bore 88c and is effectively reinforced because of its thickness. Tubular member 88 also has a first wall 88d (FIG. 5), a second wall 88e, a third wall 88f (FIG. 4), and a fourth wall 88g. The width of second region 76b as measured between the exterior surfaces of third and fourth walls 88f, 88g is substantially equal to the distance between the interior surfaces of first and second sections 82a, 84a of side walls 82, 84. Second region 76b is inserted between the interior surfaces of first and second sections 82a, 84a so that these interior surfaces of the side walls flank and abut the exterior surfaces of third and fourth walls 88f, 88g. Second region 76b is secured to first and second sections 82a, 84a in any suitable manner such as by welding. First and second sections 82a, 84a reinforce the third and fourth sides 88f, 88g of second region 78b. This aids in helping the forwardmost region of A-frame 76 to withstand lateral forces brought to bear thereon when A-frame 76 is engaged with attachment 74 and is used to manipulate and maneuver that attachment.

Figure 4:
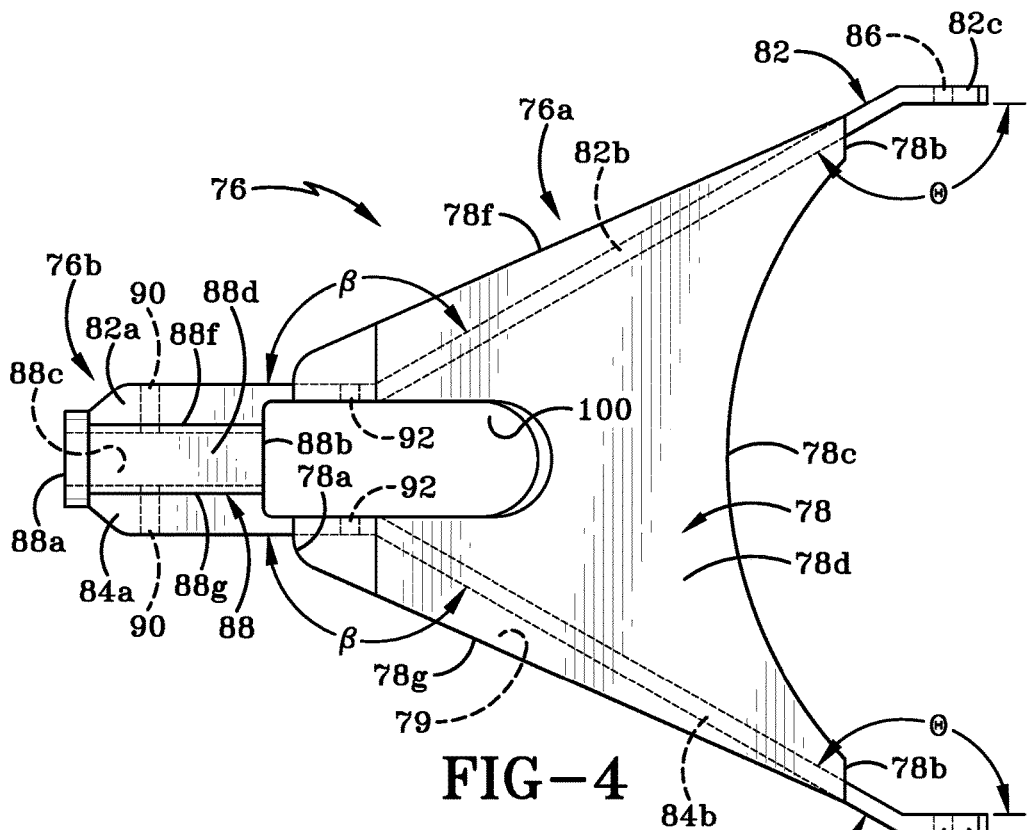
FIG. 4 is a top view of the mounting assembly shown alone.

FIGS. 4 and 5 show an aperture 90 defined in first sections 82a, 84a of first and second side walls 82, 84 and extending through third and fourth walls 88f, 88g of second region 76b. Aperture 90 intersects bore 88c of second region 76b. A second aperture 92 is defined in first sections 82a, 84a a distance rearwardly of aperture 90. Aperture 92 is located in first sections 82a, 84a proximate the transition zone from first sections 82a, 84a to second sections 82b, and 84b. Aperture 92 is further located in a region of the first sections 82a, 84a that is positioned within the forward end of first region 76a of A-frame 76 and adjacent the angled transition zone of first and second plates 78, 80.

A slot 100 is defined partially in first region 76a and partially in second region 76b of A-frame 76. Slot 100 is comprised of aligned apertures that are defined in each of the first and second plates 78, 80 and rearwardmost portions of first sections 82a, 84a. These apertures extend between the respective outer and inner surfaces 78d, 78e and 80d, 80e of the first and second plates 78, 80. Slot 100 may be oriented generally parallel to the longitudinal axis of mower 10 when A-frame 76 is installed thereon. Slot 100 includes a curved end wall at a location that is generally central on each plate 78, 80. The curvature is provided in this end wall to accommodate the curved side wall of cylinder 36 when A-frame 76 receives cylinder 36 and piston 38 therethrough as will be discussed below.

Referring now to FIG. 2, A-frame 76 is mounted to frame 14 in such a way that A-frame 76 is positioned generally between but above right and left side members 14a, 14b of frame 14 and between but above the front member 14c and the rear frame member of mower 10. As such, A-frame 76 is positioned above a lowermost portion of frame 14 where that lowermost portion includes lower surface 14e below which mower deck 40 is suspended. Each third section 82c, 84c is secured by one of fasteners 58 to the adjacent right or left side member 14a, 14b. These same two fasteners 58 are utilized to secure rear pivot arms 48 of deck hanger assembly 42 to frame 14. Because sleeve 58a and bolt 58b are to be utilized for securing both mower deck 40 and A-frame 76, sleeves 58a and bolts 58b may need to be longer than would be the case if only mower deck 40 is to be secured to frame 14. Effectively, A-frame 76 pivots at the location where it is hitched or connected to frame 14.

A-frame 76 is therefore engaged to frame 14 utilizing a component that is utilized for another purpose on mower 10. In particular, A-frame 76 may be engaged with an OEM (Original Equipment Manufacturer) component. There is thus no need to retrofit mowers that have a manual system for adjusting a mower deck as the pre-existing components which are used to secure the mower deck to the frame may be utilized to secure the A-frame to the mower. In order to secure A-frame 76 to right and left side members 14a, 14b the shaft of each elongate bolt 58b is inserted through hole 86 of one of the third sections 82c, 84c. Bolt 58b is then inserted through the bore of the associated sleeve 58a and secured thereto by threading or by the use of a nut/washer combination.

When fasteners 58 are engaged with A-frame 76 a portion of the forwardmost end of A-frame 76 extends outwardly beyond front member 14c and rests thereon when A-frame 76 is in an at-rest position (FIG. 1). Fasteners 58 act as pivot rods for the rearwardmost end of A-frame 76 and when the forwardmost end of A-frame 76 is raised vertically away from front member 14c, as will be described hereafter, A-frame 76 is caused to pivot about the axis "Y" extending along bolt shafts 58b. A-frame 76 is only secured to frame 14 by fasteners 58 and those fasteners provide the axis for rotation of A-frame 76 between the at-rest position (FIG. 1) and the operational position (FIG. 9).

Figure 8:
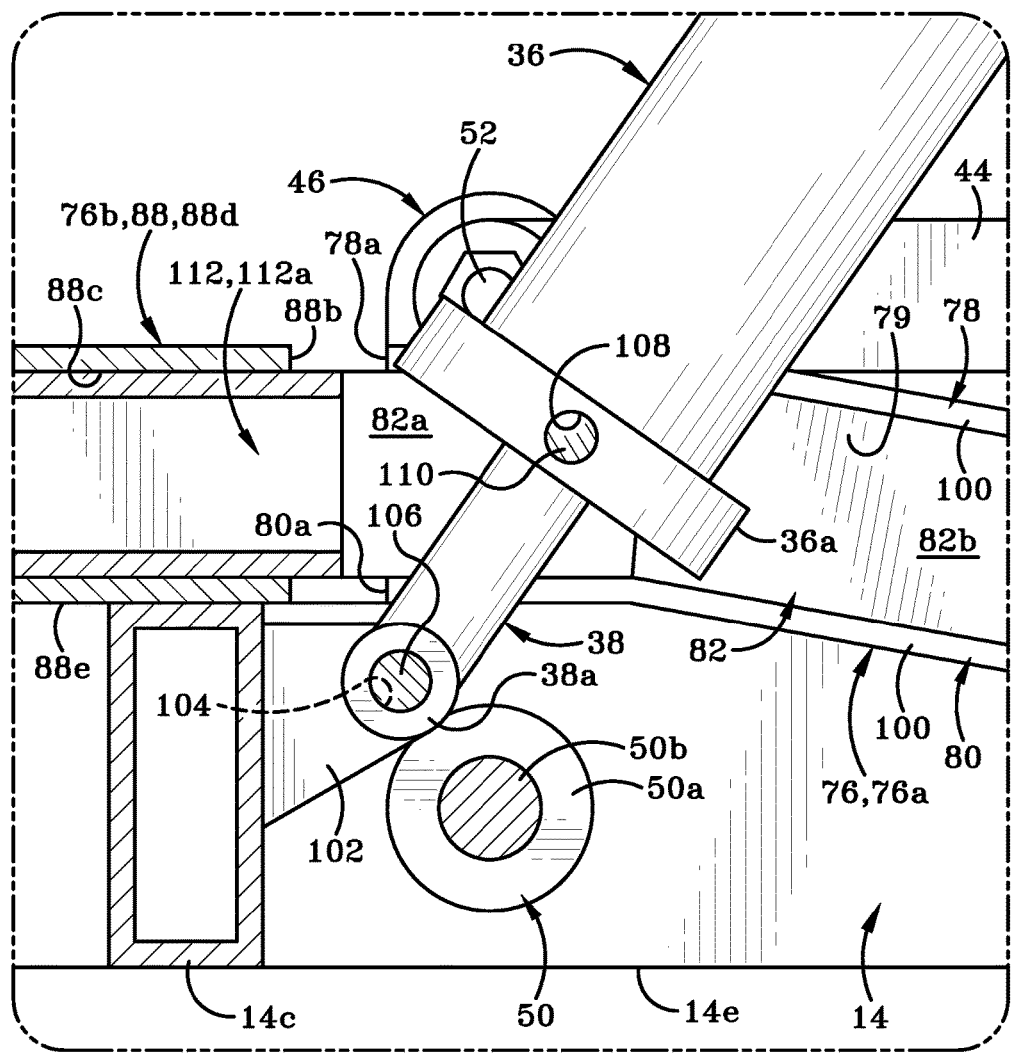
FIG. 8 is an enlarged view of the highlighted region of FIG. 7.

Hydraulic cylinder 36 and piston 38 are positioned so as to extend through slot 100 of A-frame 76 (FIGS. 2, 7 and 8). Cylinder 36 is oriented so as to extend upwardly and outwardly away from first plate 78. Piston 38 extends outwardly and downwardly from a collar 36a (FIG. 7) on the lower end of cylinder 36. A pair of mounting brackets 102 (FIG. 3) are provided on a rear surface of front member 14c. Each bracket 102 defines an aperture 104 therein that is oriented at right angles to the longitudinal axis of mower 10. The apertures 104 in the two brackets 102 are laterally aligned with each other. A hole in a free end 38a of piston 38 is alignable with apertures 104 when piston 38 and cylinder 36 are received through slot 100. A fastener 106 is received through these aligned apertures 104 and the hole in free end 38a and thereby secures piston 38 to brackets 102 and thus to frame 14.

Collar 36a of cylinder 36 defines a pair of aligned and opposed apertures 108 therein, one of which is shown in FIG. 7. It will be understood that the second of the pair of apertures 108 is defined in the opposite side of the collar from the location of the aperture 108 illustrated in FIG. 7. When A-frame 76 is mounted to frame 14 via fasteners 58 and piston 38 and cylinder 36 are positioned within slot 100 and secured to brackets 102, apertures 108 in collar 36a will align with holes 92 in A-frame 76. Each aperture 108 is threaded and a threaded fastener 110 is inserted into each through-hole 92 in A-frame 76 and subsequently into the adjacent threaded aperture 108 in collar 36a. Fasteners 110 therefore secure cylinder 36 and A-frame 76 together. Because cylinder 36 and A-frame 76 are engaged together they will tend to move in unison.

It will be understood that instead of piston 38 being engaged with frame 14, cylinder 36 may be engaged with front member 14c and piston 38 may extend upwardly and outwardly therefrom. In this instance A-frame 76 may be engaged with collar 36a of cylinder or with free end of piston 38. If this configuration of A-frame 76, cylinder 36 and piston 38 is selected other changes such as the connection point of the cylinder 36 with frame 14 and the orientation of cylinder 36 and piston 38 will likely need to be adjusted to ensure that A-frame 76 is able to pivot about the axis "Y" extending through fasteners 58.

Although not illustrated herein, it will be understood that cylinder 36 and piston 38 are in fluid communication with the hydraulic system of mower 10, particularly with a hydraulic fluid reservoir. When the hydraulic system is actuated, piston 38 is caused to extend further outwardly from cylinder 36 in the direction of arrow "F" (FIG. 9). In response to the extension of piston 38, cylinder 36 will move upwardly in the direction of arrow "E" (FIG. 1. As cylinder 36 moves upwardly the forwardmost end of A-frame 76 connected to cylinder 36 will move in unison therewith and the forward end of A-frame 76 will be raised vertically and away from front member 14c in the direction of arrow "E". Since the rearwardmost end of A-frame 76 is pivotally engaged by fasteners 58 to frame 14, A-frame 76 will pivot about the axes "Y" extending along fasteners 58. Conversely, if piston 38 is withdrawn into cylinder 36 in the direction of arrow "E", cylinder 36 will move in the direction "F" and, consequently, the forward end of A-frame 76 will be rotated back down toward a top surface of front member 14c. The hydraulic system may therefore be used to control the raising or lowering of A-frame 76 relative to front member 14c.

As indicated previously herein, A-frame 76 is used to secure attachment 74 to mower 10. Attachment 74 is provided with a shaft assembly 112 that extends outwardly and rearwardly therefrom. Shaft assembly 112 includes an end 112a (FIG. 3) complementary in shape and size to bore 88c of A-frame 76. As best seen in FIG. 7, shaft end 112a defines a series of spaced-apart holes 112b therein. Shaft end 112a is inserted into bore 88c and one of the holes 112b is brought into alignment with through-hole 90 of A-frame 76. A pin 114 is inserted through these aligned holes 112b, 90, thereby locking attachment 74 to A-frame 76 and thereby to mower 10. The connection between attachment 74 and A-frame 76 is sufficiently strong enough that when A-frame 76 is pivoted in the direction indicated by arrow "G" (FIG. 9), i.e., from the at-rest position (FIG. 1) to an active position (FIG. 9), attachment 74 is lifted upwardly in the direction indicated by arrow "I" and moved a distance upwardly away from surface 24. It should be noted that A-frame 76 when pivoted to the maximum degree is able to lift attachment through about 28" off surface 24. The positioning of fasteners 58 causes the weight during lifting operations to be shifted rearwardly and effectively on rear wheels 16 and therefore gives greater traction to these wheels.

It is also contemplated that some type of receiver or adaptive linking component could be inserted into bore 88c of A-frame 76 instead of shaft 112 and that this receiver could connect directly to attachment 74 or to a shaft 112 extending outwardly from attachment 74. The receiver or adaptive linking component could therefore aid in securing a wider variety of attachments to A-frame 76 and thereby to mower 10.

When piston 38 is retracted back into cylinder 36 then A-frame 76 pivots in the opposite direction to arrow "G" and back into the at-rest position the attachment 74 moved in the opposite direction to arrow "I" and back into contact with ground surface 24.

So, any and all attachments 74 that are to be engaged with mower 10, particularly in a position forward of the operator, need only be provided with a shaft 112 sized to be received in the forward end of A-frame 76. The system disclosed herein may be used to perform a variety of landscaping tasks simply by changing the attachment 74 engaged with mower 10.

In a first instance, mower 10 may be set up simply to mow a lawn. If this is the landscaping task that is to be performed with mower 10 then the mounting assembly, namely A-frame 76, remains engaged with frame 14 but is not used to secure any attachments 74 to mower 10. The operator will lower mower deck 40 into a position ready to cut grass by engaging lever arm 65 as described earlier herein. When mower deck 40 is moved downwardly in the direction of arrow "D" to a degree sufficient to bring blades in mower deck 40 into contact with the grass to be cut, the operator will actuate mower deck 40 using control panel 30 to rotate blades provided therein. Mower 10 may then be driven across a section of surface 24 in the direction of arrow "A" (FIG. 1) and the actuated mower deck 40 will cut the grass.

In other instances it may be desirable to perform more than one landscaping task substantially at the same time. For instance, the operator may wish to cut the grass and simultaneously aerate the lawn or blow leaves from in front of mower 10 or vacuum up such leaves or utilize a brush cutter. In these instances the operator will select the appropriate one of the attachments 74 and engage the same with mower 10. The operator will position attachment 74 in front of front member 14c, grasp the shaft 112 extending outwardly and rearwardly from attachment 74 and insert end 112a of shaft 112 into the opening to bore 88c in A-frame 76. It will be understood that A-frame 76 may be in the at-rest position when shaft 112 is inserted into bore 88c. This aids in ensuring that any load resulting from engaging attachment 74 to A-frame 76 will not be transferred to A-frame 76 before the two components are sufficiently secured together. When hole 112b in shaft 112 is aligned with aperture 90 in A-frame 76, pin 114 is inserted therethrough to lock attachment 74 to A-frame 76.

In other instances an attachment may need to be secured to mower 10 using A-frame 76 but the attachment may have a shaft positioned at a different height than is illustrated in FIG. 1. If, for example, the shaft of this other attachment is located a distance vertically above front member 14c then the operator will need to elevate the forwardmost end of A-frame 76 in order to receive this higher shaft into the same. The angle α between the forwardmost region of A-frame 76 and the rest of the A-frame 76 enables the A-frame to present a substantially horizontal second region 76b for receiving the end of the attachment's shaft into the bore 88c. This is the case no matter the height at which the forwardmost end of A-frame 76 needs to be positioned at in order to receive that shaft into bore 88c. If the forwardmost region is not angled in this manner it might be somewhat difficult to engage particular attachments to mower 10 and subsequently manipulate those attachments using A-frame 76.

Once attachment 74 is operatively engaged with mower 10 via A-frame 76 the operator will lower mower deck 40 into position and will activate both the mower deck 40 and attachment 74. Mower 10 is then ready to perform more than one landscaping task at a time. The operator will engage engine 26 and activate the hydraulic system so as to be able to raise or lower attachment 74 as needed. The raising or lowering of attachment 74 may be controlled by manipulating the appropriate levers 32, joystick 34, or other controls on control panel 30. It will be understood that if attachment 74 is a powered attachment, then wiring on mower 10 will be connected to the attachment's wiring when shaft 112 is engaged with A-frame 76. (All the wiring and hydraulic tubing has been omitted from the drawings for clarity of illustration and because those skilled in the art would understand how to link and power the various components of the system.) Mower 10 may then be driven across surface 24 cutting grass using mower deck 40 and simultaneously aerating the lawn.

It is possible for an operator to perform two landscaping tasks simultaneously or intermittently as required in only a single pass over the lawn. For example, if a leaf blower is attached to A-frame 76, the leaf blower may be actuated to blow leaves from in front of mower 10 as mower 10 moves down a stretch of lawn. Mower 10 will also cut the freshly blown grass as mower 10 continues to move down that stretch of lawn. In another example, the operator may aerate the lawn with an aerator 74 as mower 10 travels along a stretch of grass and mower deck 40 will mow the lawn immediately after it has been aerated as mower 10 continues to drive down the stretch of lawn.

Mower 10 may need to traverse an obstacle, such as a brick pathway, in the stretch of lawn that is being simultaneously aerated and mowed in a single pass. A forward attachment 74, such as the aerator, may cause damage to such a pathway. In this instance, the operator will temporarily actuate cylinder 36 so as to pivot the front end of A-frame 76 away from front member 14c and thereby lift attachment 74 upwardly away from surface 24. In this manner contact between attachment 74 and surface 24 is broken. Mower deck 40 will continue to mow but, of course, because no grass is present on the pathway nothing will be cut by mower deck 40. As soon as attachment 74 clears the pathway, the operator will actuate the hydraulic system to lower A-frame 76 and thereby attachment 74 back toward surface 24 so that the simultaneous landscaping tasks may be performed. Because mower 10 may be a zero-turn mower, an entire lawn may be aerated and mowed in approximately the same time that it would take to perform only one of these landscaping tasks. The ability to perform two landscaping tasks at essentially the same time will save both time and money.

In another instance mower deck 40 may be disengaged from frame 14 and A-frame 76 alone will be engaged therewith. This may occur, for example, if it is winter and mower 10 is to be used as a snowplow or snowblower by engaging a snowplow blade or blower to A-frame 76. Obviously, mower deck 40 would not be needed or even desirable under these circumstances and may simply be disconnected from frame 14.

While A-frame 76 has been described herein as being fabricated from a plurality of different component pieces (plates 78, 80, side walls 82, 84 which essentially comprise a base and a tubular member 88 that extends outwardly from one end of this base) it will be understood that the frame 76 may be fabricated as a single, unitary or monolithic component.

It will further be understood that A-frame 76 may be operated by an actuator that is not hydraulically driven but is instead electrically or pneumatically driven. It is therefore contemplated that in the instances where the hydraulic system is not utilized for actuating A-frame 76, the A-frame 76 will be operatively engaged to the alternative actuating system and will be pivoted by that alternative actuating system so as to raise and lower any attachment 74 engaged with A-frame 76.

It will also be understood that the A-frame could be differently shaped and instead of having an A-shape the frame could be rectangular or any other desired shape and be operable in the same manner as described herein. It is contemplated that any differently shaped mounting assembly could be engaged with mower 10 in the manner described herein and be operated as described herein.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration set out herein are an example and the invention is not limited to the exact details shown or described.

The invention claimed is:

1. A system comprising:
   a mower having a frame with a plurality of wheels mounted thereon and the mower has a turn radius that approximates zero;
   a mower deck;
   a deck hanging assembly engageable with the mower deck;
   at least one connector for securing the deck hanging assembly to the frame; wherein the deck hanging assembly positions the mower deck beneath the frame; and
   a mounting assembly adapted to connect an attachment to the mower; wherein the mounting assembly is a generally A-shaped frame that includes an apex at one end and a pair of legs extending outwardly from an opposite end; wherein the at least one connector also secures the pair of legs of the A-shaped frame to the frame of the mower; and wherein the apex of the A-shaped frame defines a bore therein; and the bore extends substantially parallel to a longitudinal axis of the mower where the longitudinal axis extends between a front end and a rear end of the mower; and wherein the bore is adapted to receive a connector from the attachment therein.

2. The system as defined in claim 1, wherein the mounting assembly is located above a lowermost portion of the frame.

3. The system as defined in claim 1, wherein the mounting assembly is positioned vertically above the mower deck.

4. The system as defined in claim 1, further comprising an actuator operatively engaged with the mounting assembly and being actuatable to selectively raise or lower a portion of the mounting assembly relative to the frame.

5. The system as defined in claim 4, wherein the actuator is a hydraulic actuator.

6. The system as defined in claim 5, wherein the mounting assembly defines a slot therein; and the hydraulic actuator includes a cylinder and a piston; and cylinder is engaged with mounting assembly.

7. The system as defined in claim 1, further comprising an adjustment assembly operatively engaged with the deck hanging assembly, said adjustment assembly being selectively operable to raise or lower the mower deck relative to the frame.

8. The system as defined in claim 1, further comprising an attachment for performing a landscaping task; wherein the attachment is selectively detachably engaged with the mounting assembly at the same time as the mower deck is engaged with the frame.

9. The system as defined in claim 8, wherein both the attachment and the mower deck are selectively operable to perform different landscaping tasks substantially at the same time.

10. The system as defined in claim 1, wherein the mounting assembly comprises:
    a base having a first end and a second end; wherein the base comprises:
        a first plate;
        a second plate;
        a first side wall and a second side wall extending between the first and second plates; wherein the first and second plates and the first and second side walls bound and define a space;
    wherein the at least one connector secures the second end of the base to the frame of the mower in such a way that the base is pivotable relative to the frame; and
    a tubular member extending outwardly from the first end of the base; said tubular member defining a bore therein that is adapted to receive a shaft from the attachment therein; and wherein the tubular member has a first end that is received within the space and a remaining length of the tubular member extends outwardly beyond the first ends of the first and second plates; and
    wherein a first section of each of the first and second side walls extends outwardly beyond the first ends of the first and second plates; and the first sections of the side walls flank the remaining length of the tubular member.

11. The system as defined in claim 1, wherein the mounting assembly comprises:
    a base having a first end and a second end; wherein the base comprises a first section proximate the first end and a second section proximate the second end; and wherein the second section is oriented at an obtuse angle relative to the first section; and wherein the second section angles downwardly and rearwardly away from the first section;
    wherein the at least one connector secures the second end of the base to the frame of the mower in such a way that the base is pivotable relative to the frame; and
    a tubular member extending outwardly from the first end of the base; said tubular member defining a bore therein that is adapted to receive a shaft from the attachment therein;
    and wherein the base comprises:
        a first plate having an outer surface and an inner surface;
        a second plate having an outer surface and an inner surface; and wherein the inner surface of the first plate is positioned opposite the inner surface of the second plate;
        a first side wall and a second side wall extending between the first and second plates; and wherein a distance between the first plate and the second plate remains substantially constant from the first end to the second end of the base wherein the distance is measured from the inner surface of the first plate to the inner surface of the second plate.

12. The system as defined in claim 11, wherein the tubular member is a standard two-inch hitch receiver.

13. A system comprising:
    a mower having a frame with a plurality of wheels mounted thereon and the mower has a turn radius that approximates zero;
    a mower deck;
    a deck hanging assembly engageable with the mower deck;
    at least one connector for securing the deck hanging assembly to the frame; wherein the deck hanging assembly positions the mower deck beneath the frame; and
    a mounting assembly adapted to connect an attachment to the mower; wherein the at least one connector also secures part of the mounting assembly to the frame; and wherein the mounting assembly comprises:
        a base having a first end and a second end; wherein the base includes a first section proximate the first end and a second section proximate the second end; and wherein the second section is oriented at an obtuse angle relative to the first section; and wherein the second section angles downwardly and rearwardly away from the first section; wherein the at least one connector secures the second end of the base to the frame of the mower in such a way that the base is pivotable relative to the frame; and a tubular member extending outwardly from the first end of the base;

said tubular member defining a bore therein that is adapted to receive a shaft from the attachment therein;

wherein the base comprises:

a first plate;

a second plate;

a first side wall and a second side wall extending between the first and second plates; wherein the first and second plates and the first and second side walls bound and define a space; and wherein the tubular member has a first end that is received within the space and a remaining length of the tubular member extends outwardly beyond the first ends of the first and second plates.

14. The system as defined in claim 13, wherein the base and tubular member together form an A-shaped member and the tubular member comprises an apex of the A-shaped member.

15. The system as defined in claim 13, further comprising a fastener that is adapted to lock the tubular member to a shaft of the attachment when received in the bore.

16. The system as defined in claim 13, wherein the second end of the base includes a pair of legs which extend outwardly therefrom and a first one of the legs is secured to a right side member and a second one of the pair of legs is secured to a left side member.

17. The system as defined in claim 13, wherein the tubular member is a standard two-inch hitch receiver.

18. A system comprising:
a mower having a frame with a plurality of wheels mounted thereon and the mower has a turn radius that approximates zero;
a mower deck;
a deck hanging assembly engageable with the mower deck;
at least one connector for securing the deck hanging assembly to the frame; wherein the deck hanging assembly positions the mower deck beneath the frame; and
a mounting assembly adapted to connect an attachment to the mower; wherein the at least one connector also secures part of the mounting assembly to the frame; wherein the mounting assembly comprises:
a base having a first end and a second end; wherein the base comprises:
a first plate;
a second plate;
a first side wall and a second side wall extending between the first and second plates; wherein the first and second plates and the first and second side walls bound and define a space;
wherein the at least one connector secures the second end of the base to the frame of the mower in such a way that the base is pivotable relative to the frame; and
a tubular member extending outwardly from the first end of the base; said tubular member defining a bore therein that is adapted to receive a shaft from the attachment therein; wherein the tubular member has a first end that is received within the space and a remaining length of the tubular member extends outwardly beyond the first ends of the first and second plates; and wherein the tubular member has a second end remote from the first ends of the first and second plates; and wherein an opening to the bore is defined in the second end of the tubular member.

\* \* \* \* \*